US006970556B2

(12) United States Patent
Wall et al.

(10) Patent No.: US 6,970,556 B2
(45) Date of Patent: Nov. 29, 2005

(54) MULTI-MEDIA COMMUNICATION SYSTEM HAVING PROGRAMMABLE SPEED DIAL CONTROL INDICIA

(76) Inventors: Daniel G. Wall, 1355 Vale Dr. Suite H, Copley, OH (US) 44321; Calvin E. Lewis, 3760 Fairway Park Dr. Suite 206, Copley, OH (US) 44321

( * ) Notice: Subject to any disclaimer, the term of this patent is extended or adjusted under 35 U.S.C. 154(b) by 650 days.

(21) Appl. No.: 10/096,563

(22) Filed: Mar. 13, 2002

(65) Prior Publication Data

US 2003/0059033 A1 Mar. 27, 2003

Related U.S. Application Data

(63) Continuation-in-part of application No. 09/961,532, filed on Sep. 24, 2001.

(51) Int. Cl.[7] ............................ H04M 1/00; H04M 3/00
(52) U.S. Cl. ............................ 379/355.09; 379/355.01
(58) Field of Search ...................... 379/355.01–355.07, 379/355.09, 201.05, 218.01, 207.11; 455/414.1, 415, 550.1, 564

(56) References Cited

U.S. PATENT DOCUMENTS

| | | | | | |
|---|---|---|---|---|---|
| 5,483,586 | A | * | 1/1996 | Sussman | 379/218.01 |
| 5,655,015 | A | | 8/1997 | Walsh et al. | |
| D389,146 | S | | 1/1998 | Tan | |
| 5,815,153 | A | * | 9/1998 | Isensee et al. | 345/764 |
| 6,188,677 | B1 | | 2/2001 | Oyama et al. | |
| 6,240,168 | B1 | | 5/2001 | Stanford et al. | |
| 6,330,244 | B1 | | 12/2001 | Swartz et al. | |
| 6,366,653 | B1 | | 4/2002 | Yeh et al. | |
| 6,366,771 | B1 | * | 4/2002 | Angle et al. | 455/414.1 |
| 6,389,005 | B1 | | 5/2002 | Cruickshank | |
| 6,396,907 | B1 | | 5/2002 | Didcock | |
| 6,424,711 | B1 | | 7/2002 | Bayless et al. | |
| 6,429,855 | B2 | | 8/2002 | Pabon et al. | |
| 2002/0085535 | A1 | | 7/2002 | Williams | |
| 2002/0086702 | A1 | | 7/2002 | Dimenstein et al. | |

OTHER PUBLICATIONS

Symbol Technologies, Press Release, Symbol Announces Wireless LAN Telephone System. Jan. 19, 1998.

* cited by examiner

*Primary Examiner*—Curits Kuntz
*Assistant Examiner*—Alexander Jamal
(74) *Attorney, Agent, or Firm*—Timothy P. O Hagan

(57) ABSTRACT

The present multi-media subscriber station has control unit and a plurality of communication devices. Each communication device includes speed dial controls which, when activated but a user, provide for establishing a communication session to a communication end point associated with the speed dial control. Each speed dial control is associated with a programmable image display on which an image associated with the communication end point may be displayed.

8 Claims, 11 Drawing Sheets

380

| Standby State - Waiting for Events | |
|---|---|
| **Events** | **Steps** |
| 388 Audio Session Signal from Packet Voice Gateway | · Transition to Call Signaling State<br>· Report State Transition to CSS Application |
| 390 Subscriber Interface Control (Off Hook) | · Provide Message Display Content<br>· Provide Message Display Layout Control |
| 392 Session Setup Event from CSS Application | · Send Call Signaling Message to Gateway<br>· Transition to Call Signaling State<br>· Report Transition to CSS Application |

382

| Call Signaling State - Waiting for Events | |
|---|---|
| **Events** | **Steps** |
| 394 On Hook Event | · Return to Standby State<br>· Report State Transition to CSS Application |
| 396 Termination of Signaling | · Return to Standby State<br>· Report State Transition to CSS Application |
| 398 Ready for Audio Session | · Transition to Audio Session State<br>· Report State Transition to CSS Application |

| | Off Hook State - Waiting for Events | |
|---|---|---|
| | Events | Steps |
| 400 | Subscriber Interface Control (Key Pad Activation) from CSS Application | • Generate DTMF Tone |
| 402 | Validation of Number Sequence | • Send Call Signaling Messages to Gateway<br>• Transition to Call Signaling State<br>• Report Transition to CSS Application |
| 404 | Subscriber Interface Control (On Hook) | • Return to Standby State |

386

| | Audio Session State - Waiting for Events | |
|---|---|---|
| | Events | Steps |
| 406 | Termination of Audio Session | • Return to Off Hook State |
| 408 | Subscriber Interface Control (Key Pad Activation) | • Generate DTMF Tone |
| 410 | Subscriber Interface Control (On Hook) from CSS Application | • Return to Standby State |

| | Base State - Waiting for Events | |
|---|---|---|
| | Events | Steps |
| 350 | Audio Session Signal from Controller | · Setup Audio Session Channels<br>· Go to Audio Session State |
| 352 | Audio Session Initiation by Subscriber | |
| 354 | Audio Session Initiation by SD | |
| 356 | Subscriber Interface Control | · Replay Control Activation to Control Unit<br>· Go to Base State |
| 358 | Receive Display Content and Receive Display Layout Control | · Update Display<br>· Go to Base State |
| 360 | Receive Processing Script | · Process Script<br>· Go to Base State |
| 362 | WAN Telephone Signal | · Go to WAN State |
| 364 | Detect Subscriber Device | · Send Initialize Subscriber Message<br>· Go to Base State |

346

| | Startup State - Waiting for Events | |
|---|---|---|
| | Events | Steps |
| 366 | Network Connection | · Session Request to Control Unit |
| 368 | Receive Login Script | · Process Logon Script<br>· Provide Interface Configuration<br>· Go to Base State |

Figure 7

| Start Up State - Waiting for Events | | |
|---|---|---|
| | Events | Steps |
| 300 | Open Session Request on Predetermined Port | · Establish New Local Communication Device State Machine<br>· Establish Session<br>· Send Logon Control Scripts<br>· Get CSS Interface Configuration<br>· Provide Main Menu Display Content<br>· Provide Main Menu Layout Control<br>· Go to Main Menu State |

Figure 8a

| Main Menu State - Waiting for Events | | |
|---|---|---|
| | Events | Steps |
| 302 | Menu Selection | · Go to Selected State |
| 304 | Audio Session Signal to CSS | · Complete Audio Session Signaling<br>· Set Up Audio Session Channels<br>· Go to Audio Session State |
| 306 | Audio Session Signal from CSS | |
| 308 | Initialize Subscriber Device | · Send ID Extraction Control Scripts<br>· Get Subscriber Device ID<br>· Provide Initial Display Content<br>· Provide Display Layout Control<br>· Provide Speed Dial Button Images<br>· Got to Subscriber Device Main Menu State |
| 310 | Help Request | · Set Up Audio Session Channel<br>· To Audio Help CSS<br>· Go to Audio Help State |

Figure 8b

Subscriber Device Main Menu State - Waiting for Events

| | Events | Steps |
|---|---|---|
| 302 | Menu Selection | · Go to Selected State |
| 304 | Audio Session Signal to CSS | · Complete Audio Session Signaling<br>· Set Up Audio Session Channels<br>· Go to Audio Session State |
| 306 | Audio Session Signal from CSS | |
| 307 | Speed Dial Selection | |
| 310 | Help Request | · Provide Help Menu Display Content<br>· Provide Help Menu Display Layout Control<br>· Go to Graphic Help State |
| 322 | Mesage Request | · Get Messages from Remote System<br>· Sort Messages by Type<br>· Provide Message List Content<br>· Provide Message List Layout Control<br>· Go to Message List State |
| 324 | Audio Message Request | |
| 326 | Subscriber Device Remove | · Got to Main Menu State |

Figure 8c

Subscriber Device Main Menu State - Waiting for Events

| | Events | Steps |
|---|---|---|
| 328 | Audio Session Signal to CSS | · Set Up Audio Session Channels<br>· Go to Audio Session State<br>· Set Up Audio Session Channels |
| 330 | Audio Session Signal to SD | |
| 332 | Audio Session Signal from CSS | |
| 334 | Audio Message Select | · Set Up Audio Session Channel to CSS<br>· Start Audio Content Message<br>· Go to Audio Session State |
| 336 | Message Select | · Provide Message Display Content<br>· Provide Message Display Layout Control<br>· Go to Message Display State |
| 338 | Messsage Print | · Format Message Content for Printer<br>· Send Message File to Printer<br>· Go to Message List State |
| 340 | Help Request | · Provide Help Menu Display Content<br>· Provide Help Menu Display Layout Control<br>· Go to Graphic Help State |
| 342 | Subscriber Device Remove | · Got to Main Menu State |

Figure 8d

MULTI-MEDIA COMMUNICATION SYSTEM HAVING PROGRAMMABLE SPEED DIAL CONTROL INDICIA

CROSS REFERENCE TO RELATED APPLICATIONS

The present application is a continuation in part of U.S. patent application No. 09/961,532 titled Teledata Space and Docking Station with Modular and Integrated Display filed on Sep. 24, 2001 the contents of this patent application are incorporated herein.

TECHNICAL FIELD

The present invention relates generally to managing multi-media communications, and more particularly to a multi-media subscriber station that is equipped with a control unit that enables the subscriber to program display images representing speed dial destinations.

BACKGROUND OF THE INVENTION

In an office environment, desktop telephone service is typically provided by a private telephone communication system. A contemporary private telephone communication system consists of a switching network, a plurality of desktop telephones, and a voice mail server. Each desktop telephone is coupled to the switching network by an extension line that consists of twisted pair conductors that are terminated by a telephone jack in the office. Communication between the desktop telephone and the switching network over each extension line utilizes either proprietary digital signaling or plain old telephone service (POTS) signaling. The switching network is further coupled to the public switched telephone network (PSTN) using trunk lines that are connected to a central office switch that is typically managed by the local telephone service provider. The switching network controls calls between extensions and between an extension and a remote destination via a trunk line coupled to the PSTN.

Known telephone systems also provide single button speed dial functionality. A typical desktop telephone will include a plurality of "speed dial buttons." A paper insert may be placed adjacent to the speed dial buttons for labeling each button. When a button is pressed, the system will automatically dial the number associated with the button.

A problem associated with such systems is that manual labeling of speed dial buttons is cumbersome. What is needed is a multi-media communication management system that is equipped with a control unit that enables the subscriber to conveniently access their most frequently used contact numbers in a mode that is simple to use.

SUMMARY OF THE INVENTION

The present multi-media subscriber station having programmable graphic display buttons for speed dialing comprises a device that communicates with a controller that interfaces with one or more communication medium service providers. The controller translates multi-media communications received from a multi-media service provider into the protocols required for use by the subscriber station. The controller further records dynamic information relating to the subscriber station that is serving a subscriber device for communication and control signaling. This enables the controller to receive communication signaling for a subscriber device and translate and route communication signaling to the subscriber station serving the subscriber device. The communication and control signaling between the controller and the subscriber stations may be wireless in nature with the subscriber stations being powered by an internal battery and/or connection to a local source of conventional line voltage. The multi-media subscriber station is equipped with a plurality of programmable graphic display buttons that enable the subscriber to select speed dial access to destinations represented by images thereon. This enables the subscriber to conveniently initiate a communication connection with a one of the subscriber's frequently called destinations, as represented by the image, by simply operating a button on which the image is displayed. The buttons may be mechanical switches or virtual buttons implemented with a touch panel display.

For a better understanding of the present invention, together with other and further aspects thereof, reference is made to the following description, taken in conjunction with the accompanying drawings, and its scope will be pointed out in the appended clams.

FIGS. *6a* & *6b* illustrate table diagrams representing exemplary states of operation of a subscriber station accordance with one embodiment of the present invention;

FIG. 7 illustrate table diagrams representing exemplary states of operation of a subscriber station accordance with one embodiment of the present invention; and FIGS. *8a–8d* illustrate table diagrams representing an exemplary state of operation of a communication management system in accordance with one embodiment of the present invention.

DESCRIPTION OF THE PREFERRED EMBODIMENT

It should be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Communication Subscriber station

Figure 1:
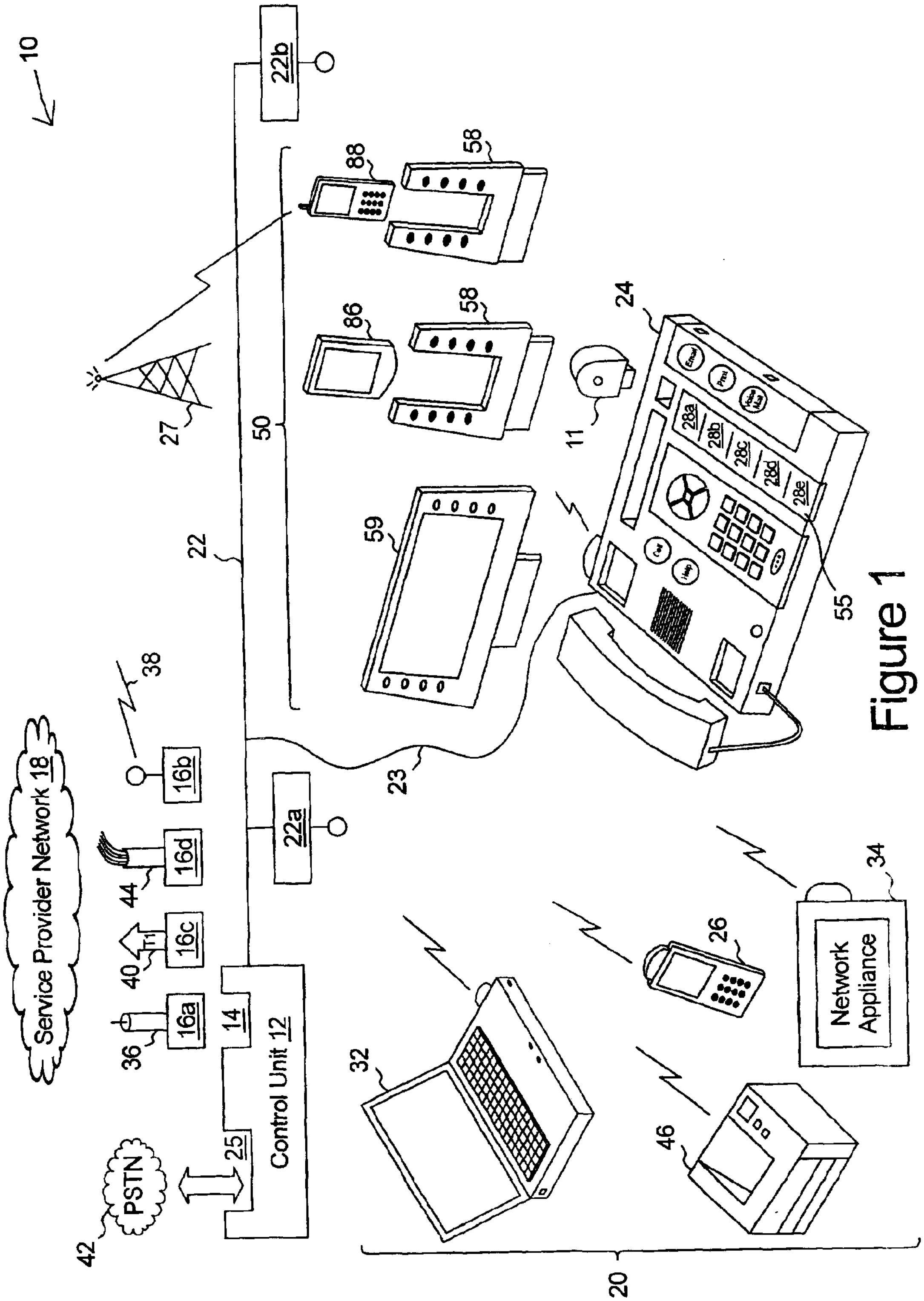
FIG. 1 is a block diagram view of a modular multi-media communication management system in accordance with one embodiment of the present invention.

Referring to FIG. 1, an exemplary architecture of the multi-media communication management system 10 of the present invention is shown. The multi-media communication management system 10 includes a control unit 12 that is coupled with a plurality of local communication devices 20 over a wireless local area network 22 consisting of a plurality of wireless interface access point 22*a*, 22*b* (or by a wired network connection 23 to the backbone wired network of the wireless local area network 22). The local communication devices 20 may include: subscriber stations 24, wireless dialog handsets 26, traditional computer systems 32, network printers 46, and various network appliances 34.

Each subscriber station 24 may serve one of a plurality of subscriber devices 50 that may include a subscriber data assistant 86 and a wireless network telephone 88 (operating in either a wide area wireless network 27 or within the wireless local area network 22). Because each subscriber device 50 may be of a different size and shape than other subscriber devices, a docking interface 58 sized to the particular subscriber device 50 may be used to couple the subscriber device to the subscriber station 24.

Alternatively, a simple display panel 59 may be coupled to the subscriber station 24 in place of a subscriber device 50. Each subscriber station 24 includes a plurality of speed dial buttons 28*a*–28*e* positioned on a speed dial button module 55. Each speed dial button includes a graphic display on which a programmable image may be displayed. As such, a subscriber may program the system to automatically dial a selected speed dial destination upon operator activation of a particular speed dial button 28*a*–28*e*, and may select and program an image that corresponds to the speed dial destination for display on the graphic display.

Figure 5:
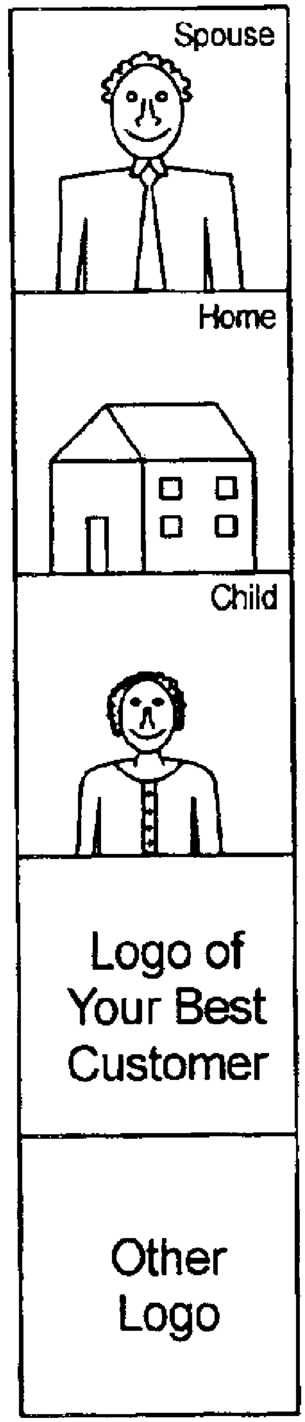
FIG. 5 illustrates a module comprising a plurality of speed dial buttons in accordance with one embodiment of the present invention.

For example, referring briefly to FIG. 5, utilizing techniques of the present invention, a subscriber may program button 28*a* for dialing a telephone call to the subscriber's spouse and may load a digital photograph of his or her spouse for display on the graphic display associated with button 28*a*. Similarly, the subscriber may program buttons 28*b*–28*e* for dialing the subscriber's home, child, customer, or other frequently called destinations and load a digital picture, logo image, or other graphic associated with each for display on the graphic display associated with each such button 28*b*–28*e*.

Referring to FIG. 1, the control unit 12 includes a multi-media communication service provider bay 14 that operatively couples one of a plurality of communication medium modules 16*a*–16*d* to the control unit 12. Each communication medium module 16*a*–16*d* is configured to interface with a service provider's multi-media communication medium 18. For purposes of illustration, communication module 16*a* may be a cable modem module for communicating over coaxial cable 36 with a multi-media communication service provider such as a local cable company, communication module 16*b* may be a wide area network radio for communication over a wireless spectrum channel 38 with a wide area wireless multi-media communication service provider such as an analog or digital cellular/PCS telephone service provider, communication module 16*c* may be a customer service unit (CSU) for communication over a T1 line 40 with a multi-media communication provider such as a local telephone service provider, and communication module 16*d* may be an optical modem for communication over a fiber channel 44 with a fiber optic multi-media communication service provider. It should be appreciated that the examples of communication modules 16*a*–16*d* are for illustrative purposes only and it is recognized that multi-media communication services may be provided by other service providers utilizing other communication technologies such as satellite RF or other. For purposes of this invention, a communication module 16 includes circuitry for interfacing between the control unit 12 and a selected multi-media communication service provider. The control unit 12 further comprises a circuit switched provider bay 25 which operatively couples one or more public switched telephone network (PSTN) channels 42.

In operation, the control unit 12 integrates and manages multi-media communication among the local communication devices 20 and between each local communication device 20 and a remote service provider (not shown) over a service provider's multi-media communication network 18. More specifically, the control unit 12 translates received multi-media communication signals from the multi-media communication network 18 (or a source local device 20) to the protocols required for use by the destination local communication device 20 (or the multi-media communication network 18).

Figure 2:
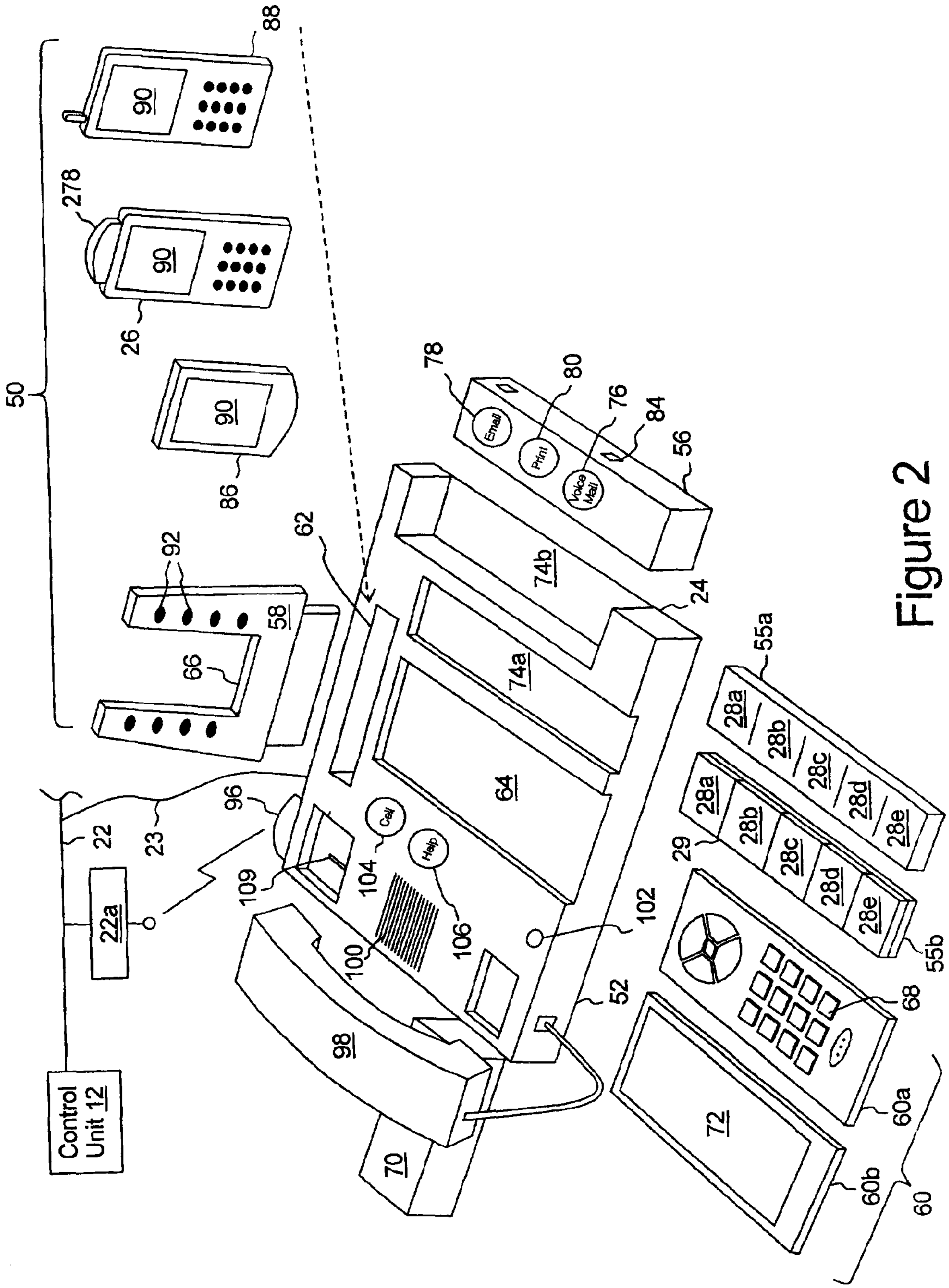
FIG. 2 is a perspective exploded view of a modular subscriber station in accordance with one embodiment of the present invention.

Referring to FIG. 2, the subscriber station 24 includes a platform unit 52 that operatively couples to the control unit 12 via either a wireless communication link between a platform unit network circuit 96 and the wireless network 22 or a direct network connection 23 between the platform unit 52 and the backbone network of the wireless network 22.

A plurality of functional modules 55*a*, 55*b*, 56, and 60 may be coupled to the platform unit 52 to form an integrated multi-media communication platform. The platform unit 52 includes a subscriber interface docking platform 64 for coupling and optionally supporting one of a plurality of modular subscriber interface units 60 to the platform unit 52. The modular subscriber interface unit 60*a* may include a plurality of buttons 68 in an arrangement similar to a typical telephone key pad to provide for subscriber input in a manner similar to that of a traditional telephone handset. The modular subscriber interface 60*b* may include a liquid crystal touch panel display 72 to provide for subscriber input through virtual buttons visible thereon.

The platform unit 52 further includes a first function specific docking platform 74*a* and a second function specific docking platform 74*b*. The first function specific docking platform 74*a* is a shallow platform for coupling to function specific modules, such as function specific module 55*a* or 55*b*. The second function specific docking platform 74*b* is a larger platform for coupling to function specific modules, such as function specific module 56, with more complex internal circuits requiring the additional size.

In the exemplary embodiment, the function specific module 55*b* may include a plurality of speed dial buttons 28*a*–28*e*, each of which may include a graphic display (such as a liquid crystal display panel) on the button. Alternatively, the entire upper surface 29 may be a touch panel display, and each button 28*a*–28*e* may be a virtual button visible on such touch panel display as represented by function specific module 55*a*.

The function specific module 56 may include circuits configured for enhancing data communication through the subscriber station 24 such as an electronic message control 78 for single button access to subscriber electronic messages, a voice mail control 76 for single button access to a subscriber's voice mail messages, a print control 80 for single button initiation of the printing of a subscriber electronic message file, and a data networking port 84.

The platform unit 52 further includes a docking bay 62 into which a modular docking interface 58 may be secured and operatively coupled to the platform unit 52. The modular docking interface 58 supports one of a plurality of modular subscriber devices 50 within a subscriber device interface bay 66 and provides for operatively coupling the modular subscriber device 50 to the platform unit 52. The modular docking interface further includes a plurality of control buttons 92 for single button selection of functions indicated on a display 90 on the subscriber device 50. Exemplary configurations for the modular subscriber device 50 include a subscriber data assistant 86, a subscriber wide area network communication device 88, and the wireless LAN dialog handset 26, each of which is discussed in more detail herein. While operatively coupled to the platform unit 52, the subscriber device 50 becomes an integral part of the subscriber interface of the subscriber station 24. A liquid crystal display 90 on the subscriber device 50 may function to display multi-media communication management information under control of the platform unit 52 and the control unit 12. Further, programmable subscriber controls 92 positioned adjacent to the subscriber device 50 may be configured to activate platform unit 52 and control unit 12 functions in accordance with the contents of the display 90 adjacent to the controls 92.

The platform unit 52 may further include one or more of the following elements: a handset 98 similar to a traditional telephone handset to provide a subscriber voice interface, a speaker 100 and a microphone 102 to provide a hands-free subscriber voice interface, a modular battery pack 70 (which fits within a battery pack bay that is not shown) for operating power when the subscriber station 24 is uncoupled from a line voltage, an on/off hook control button (or switch) 109, and a help control button 106, and a WAN control button 104, for single button selection of certain functions such as a help function and a wide area network communication function.

Communication Subscriber station Functional Diagram

Figure 3:
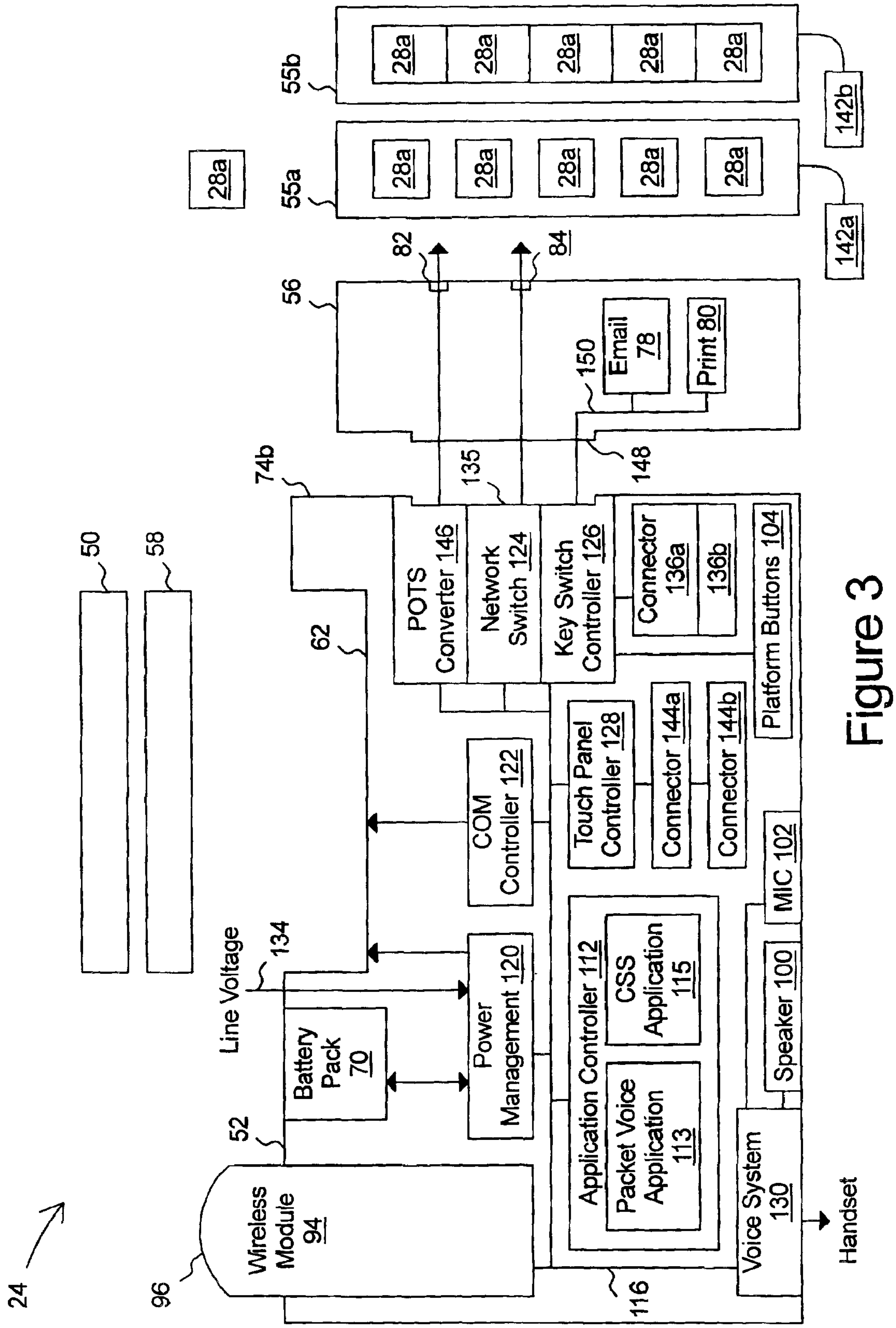
FIG. 3 is a block diagram of a subscriber station in accordance with one embodiment of the present invention.

FIG. 3 shows a block diagram of the subscriber station 24. The platform unit 52 includes a controller 112 operating a packet voice application, a SS application, and applicable drivers for a plurality of peripheral controllers. The controller 112 is coupled to a local bus 116 that interconnects the application controller 112 with each of the plurality of peripheral controllers that include a wireless module 94, a power management controller 120, a communication controller 122, a network switch controller 124, a key switch controller 126, a touch panel controller 128, a plain old telephone service (POTS) converter 146, and a voice communication system 130.

The wireless module 94 operatively couples the platform unit 52 with the control unit 12 over the wireless LAN 22 (both of FIG. 1). The power management controller 120 selectively receives input power from the battery pack 70 or external line power 134. The power management controller 120 includes appropriate circuits for converting the input power voltage to appropriate operating power required by each component of the subscriber station 24. Additionally, the power management controller 120 includes appropriate circuits for charging the battery pack 70 when the platform unit 52 is coupled to the line voltage 134 and generating appropriate power for operating and/or charging the modular docking interface 58 and the modular subscriber device 50 when coupled to the platform unit 52.

The communication controller 122 operatively couples the modular docking interface 58 and the modular subscriber device 50 to the controller 112 such that the platform 52 can exchange data with the modular subscriber device 50. In the exemplary embodiment, the communication controller is a serial communication controller that enables the serial exchange of data with a compatible serial communication controller within the modular subscriber device 50 over a physical medium. Exemplary physical mediums include hardwired contacts, an infrared transmission, and RF transmission, however other physical mediums are envisioned and the selection of a physical medium is not critical to this invention.

The network switch controller 124 provides a network data port circuit which enables the controller 112 to communicate with another network computing circuit over a network interface. The network switch controller 124 is coupled to a bus port 135 within the function specific docking platform **74*b* for coupling to a mating port 148 on the function specific module 56**.

The key switch (e.g. button) controller 126 is coupled to: a connector **136*a* which in turn is coupled to a mating connector on the modular subscriber interface unit 60*a* (FIG. 2) for interconnecting the buttons 68 to the key switch controller 126; a connector 136*b* which in turn is coupled to a mating connector 142 on the function specific module 55*b* for interconnecting the buttons 28*a*–28*e* to the key switch controller 126; the bus port 135 which in turn is coupled to a mating port 148 on the function specific module 56 for interconnecting the buttons 78 and 80 to the key switch controller 126; and other platform buttons 104 that may include the help control button 106 and, the WAN control button 104, and the on/off hook button (or switch) 109 (FIG. 2**).

In the exemplary embodiment, the key switch controller 126 may drive row and column signals to the various buttons and, upon detecting a short between a row and a column (e.g. button activation) reports the button activation to the controller 112 over the bus 116.

The touch panel controller 128 is coupled to connectors **144*a* and 144*b*. Connector 144*a* couples to a mating connector on the modular subscriber interface unit 60*b* (FIG. 2) for interconnecting the touch panel 72 to the touch panel controller 128. Connector 144*b* couples to a mating connector 142*a* on the speed dial module 55*a* for interconnecting the touch panel on the speed dial module 55*a* to the touch panel controller 128 such that the touch panel controller 128 may provide for the display of images on, and operation of, virtual speed dial buttons 28*a*–28*e*. The touch panel controller 128 may include a separate display control circuit compatible with the resolution and color depth of the display of touch panel 72 and a separate touch panel control circuit for detecting subscriber contact with the touch panel 72. As such, connector 144*b* may also couple to a mating connector 142*b* on the speed dial module 55*b* for interconnecting the graphic display associated with each speed dial button 28*a*–28*e* on the speed dial module 55*b* to the display control circuit of the touch panel controller 128 such that the display control circuit may provide for the display of images on the graphic displays associated with each button 28*a*–28*e***.

The voice system 130 generates analog audio signals for driving the speaker 100 (or the speaker in the handset 98 of FIG. 2) and detects input form the microphone 102 (or the microphone in the handset 98) under the control the packet voice application 113 operated by the controller 112.

The POTS converter circuit 146 provides a standard POTS port signal (e.g. tip and ring) for operation of a traditional telephone or a traditional fax machine coupled to a POTS port 82 on the function specific module 56. In operation the POTS converter 146 circuit interfaces between the POTS signal and the application controller 112.

Control Unit

Figure 4:
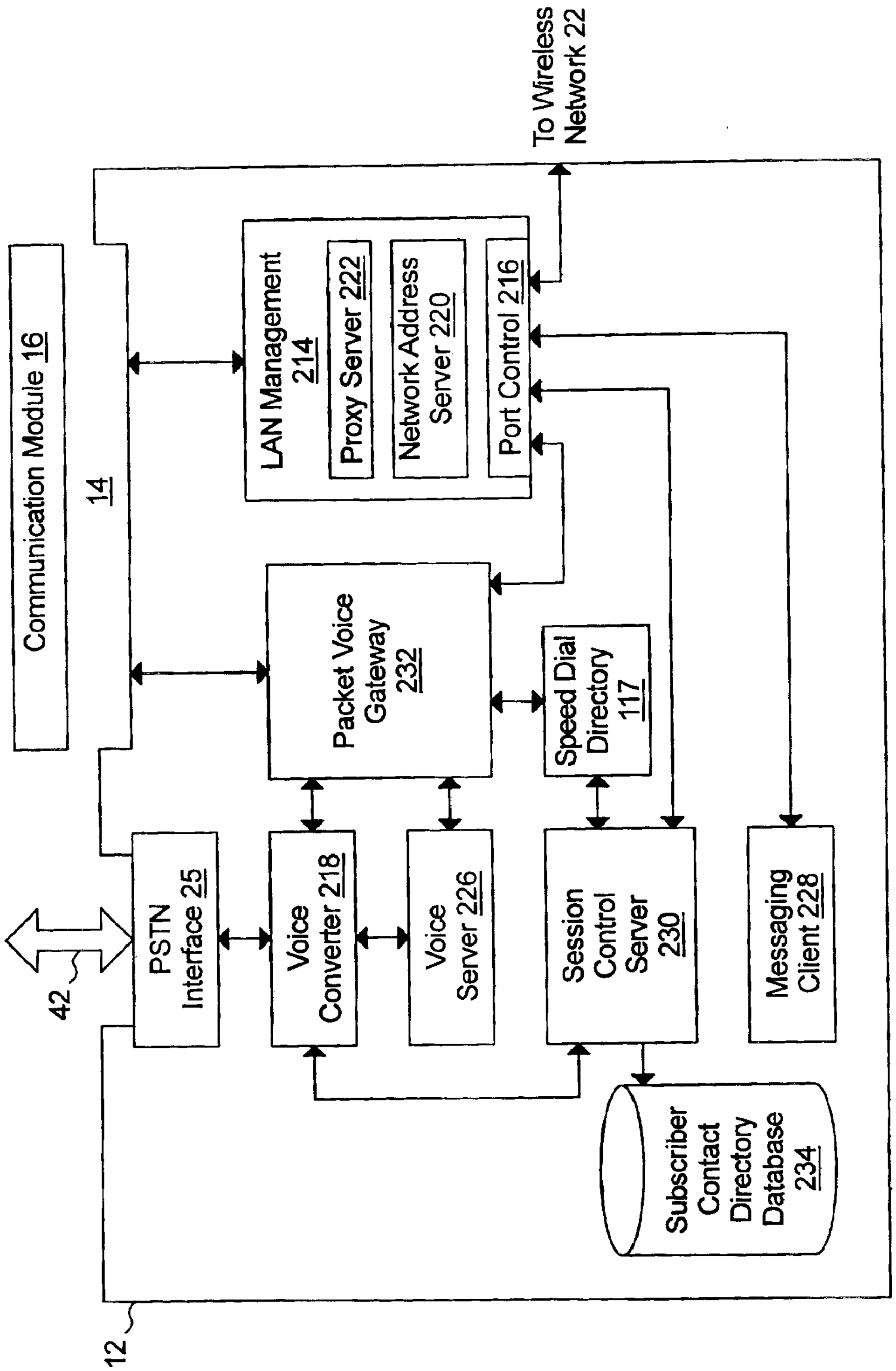
FIG. 4 is a block diagram of a multi-media communication management system controller in accordance with one embodiment of the present invention.

FIG. 4 shows a block diagram of the control unit 12 in accordance with an exemplary embodiment of the present invention. As discussed previously, the control unit 12 includes a multi-media communication service provider bay 14 which operatively couples one of a plurality of communication medium modules 16 to the control unit 12 for providing an interface to a service provider's multi-media communication medium. The control unit 12 further includes a local area network management system 214, a voice converter circuit 218, a voice server 226, a packet voice gateway 232, a session control server 230, messaging client 228, a speed dial directory, and a subscriber contact directory database 234.

The local area network management system 214 manages the communication of data between the control unit 12 and each of the local communication devices 20 (FIG. 1). The local area network management system 214 may include a network address server 220 for assigning a network address (from a block of available network addresses) to each local communication device 20 upon the local communication, device subscribing to the wireless network 22 and requesting a network address. The local area network management system 214 may also include a proxy server 222 for communicating with remote devices via the service provider multi-media communication medium 18 on behalf of each of the local communication devices 20. A port control circuit 216 may interconnect the local area network management system 214 to each of the wireless network 22, the packet voice gateway 232, the session control server 230, and the messaging client 228 over standard network port connections. The messaging client 228 provides for authenticating a subscriber to a remote messaging server (not shown) coupled to the service provider multi-media communication medium 18 and copying a plurality of subscriber messages from such messaging server.

The session control server 230 operates the protocols for sending multi-media content messages and control messages to each local communication device 20 over the wireless local area network 22. In the exemplary embodiment, the communications between the session control server 230 and each local communication device occurs using tagged messages. The tag for each message identifies the content of the message to the recipient local communication device 20. The packet voice gateway 232 provides real time voice communications between multiple local communication devices 20 and provides real time voice communications between a local communication device 20 and a remote voice communication device over either the multi-media communication service provider medium 14 or the circuit switched channel 42.

The voice converter 218 functions to convert audio signals compatible with the circuit switched channel 42 to packet voice signals compatible with the voice server 226 and the packet voice gateway 232 and, in reverse, functions to convert packet voice signals to audio signals compatible with the circuit switched channel 42. Further, the voice converter 218 functions to convert a coded extension number (e.g. DID signal) that may be included within audio session signaling through the PSTN interface 25 to a digital format compatible with the packet voice gateway 232.

The voice mail functionality is provided by a voice server module 226. The voice server module 226 generates audio prompts for providing a voice interface to accept an audio message from the originating device for the subscriber, store the message as a digital file, and send the digital file to the remote messaging server associated with the subscriber.

In the exemplary embodiment, the packet voice gateway 232 provides a voice mail origination communication signal to the voice server module 226 and, upon the voice server module 226 responding to the voice mail origination communication signal, the packet voice gateway 232 establishes a communication session channel with the originating device, establishes a communication session channel with the voice server module 226, and relays audio data between the two for the duration needed for accepting the audio message.

The subscriber contact directory database 234 includes a contact directory for each of a plurality of subscribers. Within each contact directory are a plurality of contact files that include basic information associated with the contact, such as company name, telephone number, e-mail address, mailing address, fax number and other relevant information. The contact directory provides destination information which may be used by the packet voice gateway 232 and the session control server 230 for establishing communication channels from a subscriber station 24 to a selected contact.

The voice converter 218 functions to convert audio signals compatible with the circuit switched channel 42 to packet voice signals compatible with the voice server 226 and the packet voice gateway 232 and, in reverse, functions to convert packet voice signals to audio signals compatible with the circuit switched channel 42. Further, the voice converter 218 functions to convert a coded extension number (e.g. DID signal) that may be included within audio session signaling through the PSTN interface 25 to a digital format compatible with the packet voice gateway 232.

The speed dial directory 117 may be implemented as part of the session control server 230 and/or as part of the packet voice gateway 233. The speed dial directory 117 stores, for each subscriber, a list of speed dial destinations (and a telephone code associated with each destination) that the subscriber has programmed to the list. The speed dial directory 117 also stores an image file in association with each destination or code that the subscriber has loaded to the speed dial directory 117.

As will be discussed later, when a subscriber couples his or her subscriber device 50 (FIG. 1) to a subscriber station 24, the speed dial buttons 28*a*–28*e* function to initiate telephone calls to the destinations programmed into the speed dial directory 117 by the subscriber, and the display panels thereon display the associated images loaded by the subscriber.

Each of the local area network management system 214, the packet voice gateway 232, the voice converter 218, the voice server 226, the session control server 230, the speed dial directory 117, and the messaging client 228 operate as an integrated system under the control of the session control server 230.

Session Control Server

Referring to FIG. 4 in conjunction with the tables of FIGS. 8*a*–8*d*, exemplary operation of the session management server 230 providing multi-media communication management in accordance with the present invention is shown.

The session control server 230 operates as a multi-tasking event driven state machine. A separate state machine is operated by the session control server 230 for each of the local communication devices 20 (FIG. 1). During operation of each state machine, the session control server 230 receives event signals from each of the voice server 218, the messaging client 228, the packet switched voice gateway 232, the multimedia communication service provider medium 18, and the particular local communication device 20 for which the state machine is operated. Each state machine includes multiple processing states and within each processing state there are a plurality of events that may be detected by the session control server 230. Each event has a processing state dependent processing sequence that is processed by the session control server 230.

FIGS. 8*a*–8*d* represent tables showing exemplary operational states of the session control server 230. Referring to the tables of FIGS. 8*a*–8*d* in conjunction with the block diagram of FIG. 4, operation of the session control server 230 for providing exemplary multi-media communication management in accordance with the present invention is shown.

The table of FIG. 8*a* represents a start up state. In the start up state, the session control server 230 is waiting for an open session request from a new subscriber station 24 on a predetermined port. When a subscriber station 24 has just operatively coupled to the local area network 22, obtained a network address from the network address server 220, and is ready to operate, the management client 115 (FIG. 3) sends an open session request to a predetermined network address (matching that of the session control server 230) on the predetermined port. Event 300 represents receipt of an open session request from the subscriber station 24. In response to event 300, the session control server 230 performs various steps to initiate management control of multi-media communications of the subscriber station 24 that include: establishing a session in response to the open session request; sending control messages to the subscriber station 24 that, when executed by the management client 115, providing for the subscriber station 24 to detect its subscriber interface configuration (e.g. whether the subscriber station 24 includes a display screen and what capabilities such as video capabilities and graphic resolution capabilities the display screen may have) and to report its subscriber interface configuration back to the session control server 230; obtaining the subscriber interface configuration; providing main menu display content messages and main menu layout control messages to the subscriber station 24 that are compatible with the particular display (if any) that is included in the subscriber interface configuration reported by the subscriber station 24; and transitioning to a main menu state as represented by FIG. 8*b*.

When in the main menu state, the session control server 230 is waiting for one of a plurality of events to occur that may include an event 302 that represents a message from the subscriber station 24 indicating subscriber selection of a menu choice from the main menu, event 304 that represents receipt of a message from the subscriber station 24 indicating that the subscriber station 24 has begun a voice session between the subscriber station 24 and the packet voice gateway 232, event 308 that represents a message from the subscriber station 24 indicating that a subscriber device 50 has been operatively coupled to, and is ready to be served by, the subscriber station 24, and event 310 that represents a message from the subscriber station 24 indicating that the subscriber has activated a help control (for example, pressing the help button 106).

In response to event 302, the session control server 230 executes steps associated with the selected menu choice, and may transition to a state corresponding to the selected menu choice. For example, if one of the menu choices were to obtain stock quotes for a predetermined portfolio, obtain local weather, or obtain any other information from a predetermined Internet URL, the session control server would, in response to event 302 (e.g. the message from the subscriber station 24 indicating the menu selection) establish a TCP/IP connection with the predetermined URL, obtain the information, provide the information in the form of content messages to the subscriber station 24, and provide control messages to the subscriber station 24 to output the content information through the audio interface or through a display screen if the subscriber station 24 is configured with a subscriber interface that includes a display screen (as determined in steps performed following event 300 of FIG. 8*a*).

In response to event 304, the session control server 230 may query the packet voice gateway 232 to obtain information regarding the voice session such as telephone number (and name or person or company associated with the telephone number) of the other device that is participating in the session through the packet voice gateway 232, send content messages to the subscriber station 24 that includes the information regarding the voice session, and send control messages to the subscriber station 24 to output the content information on the display screen if the subscriber station 24 is configures with a subscriber interface that includes a display screen.

In response to event 308 indicating that a subscriber device 50 has been coupled to the subscriber station 24, the session control server 230 performs steps required to begin supporting the subscriber device 50 through the subscriber station 24. Those steps may include: sending content and control messages to the subscriber station 24 that represent a script for extracting identification information from the subscriber device 50 and represent an instruction to execute the scripts, obtaining messages from the subscriber station 24 that include information about the subscriber device (such as subscriber device ID and display resolution and video capabilities) that was provided by the subscriber device in response to the subscriber station 24 executing the script, providing content messages with subscriber device main menu content and control messages for displaying the subscriber device main menu content on the subscriber device 50 display screen in accordance with the display resolution and video capabilities; providing content messages with the image content for the display panel(s) associated with the speed dial buttons and control messages for displaying such images on such display panel(s); and transitioning to the subscriber device main menu state as represented by FIG. 8*c*.

In response to event 310 that represents subscriber activation of a help control such as the help button 106 while in the main menu state, the session control server 230 selects help files from the database 234 that include help content that is related to the operating state of the subscriber station 24 and is in a format that corresponds to the subscriber interface of the subscriber station 24 as determined during steps associated with event 300 of FIG. 8*a*.

More specifically (with respect to selecting help content), the session control server 230 selects the help file that is matched to the most recent message received from the subscriber station 24 (except for the message indicating subscriber activation of the help control). For example, if the most recent message received from the subscriber station 24 (prior to help control activation) was a menu selection, the session control server selects the help file associated with such menu selection and, if the most recent message received from the subscriber station 24 was an indication that a voice session has begun, the session control server selects the help file associated with the beginning of a voice session while in the main menu state.

More specifically (with respect to selecting a format, the session control server utilizes the subscriber interface configuration information provided during execution of steps related to event 300 (initial logon) to determine whether the subscriber station 24 is configured for an audio interface only, an audio interface with still image capabilities on a display screen, or an audio interface with full motion video display capabilities. The session control server then selects a file that includes the content and that is either audio only, still image graphics with synchronized audio that references and explains the still image graphics, or full motion video with synchronized audio that references and explains the video images to match the subscriber interface capabilities of the subscriber station 24.

Following selection of the help file, the session control server 230 will provide help content messages to the subscriber station 24 and provide subscriber interface output control messages to the subscriber station 24 to instruct the subscriber station 24 to output the help content messages through the combination of the voice interface and the still image display or video display interface as applicable.

It should be appreciated that a portion of the help file may include content that represents a menu of related help files. As such, after output of the help file through the subscriber interface, the subscriber may select a related help file from such menu. In which case, the session control server 230 would select the related help file that corresponds to the subscriber selection and execute the other steps associated with event 310. However, if another event 310 is received indicating that the subscriber has activated the help control a second time without an intervening selection or during a during a predetermined time period following the first activation of the help control, the session control server 230 will send control messages to the subscriber station 24 instructing the subscriber station 24 to establish an audio session with the help station 25 though the packet voice gateway 232 such that the subscriber may speak with the operator of the help station 25.

The subscriber device main menu state of FIG. 8*c* is similar to the main menu state of FIG. 8*b* except that because the subscriber station 24 is serving a subscriber device when in the subscriber device main menu state, additional functions may be available to the subscriber as menu choices. When in the subscriber device main menu state, the session control server 230 is waiting for one of the events associate with the subscriber device main menu state that include event 302, 304, and 310 are the same as in the main menu state and the response of the session control server 230 may be the same as discussed above with respect to FIG. 8B and are not repeated for sake of brevity. However, because speed dial functionality is available after the subscriber station 24 has been associated with a subscriber by the initialization of the subscriber's subscriber device, event 307 represents receipt of a speed dial selection.

Other available events include event 322 which represents a message indicating subscriber selection of a choice to obtain messages (such as by activation of the menu choice on a touch panel of the subscriber device 50 or by activation of an email button 78 as shown in FIG. 2); event 324 representing subscriber selection of a choice to obtain voice messages (such as by activation of the menu choice on a touch panel of the subscriber device 50 or by activation of a voice mail button 76 as shown in FIG. 2); and event 326 that represents a message from the subscriber station 24 indicating that the subscriber device 50 has been decoupled from the subscriber station 24 is no longer served by the subscriber station 24.

In response to event 307, the session control server executes steps applicable to provide the telephone number associated with the subscriber activated speed dial button to the packet voice gateway 232 such that the packet voice gateway may complete an audio session between the subscriber station 24 and the telephone number associated with the activated button and transition to the audio session state.

In response to events 322 and 324, the session control server 230 obtains messages associated with the subscriber device 50 from a remote messaging server coupled to the service provider medium, sorts the messages in accordance with the message type selection, provide messages representing message list display content and message list display layout control in accordance with the parameters of the graphic display 90 on the subscriber device 50, and then transitions to a message list state (FIG. 8*d*). In response to event 326 the control unit transitions to the main menu state (FIG. 8*b*).

When in the message list state of FIG. 8*d*, the list of messages is displayed on the subscriber device 50 and the session control server 230 is waiting for one of the events associated with the message list state. The events include event 304, which like the main menu state, represents a message from the subscriber station 24 indicating that the subscriber station 24 has begun a voice session between the subscriber station 24 and the packet voice gateway 232, event 310, which like the main menu state, represents a message from the subscriber station 24 indicating that the subscriber has activated a help control (for example, pressing the help button 106), and event 326, which like the subscriber device main menu state, represents a message from the subscriber station 24 indicating that the subscriber device 50 has been decoupled from the subscriber station 24 is no longer served by the subscriber station 24. The events further include event 334 that represents a message indicating that the subscriber has activated a control to obtain a voice message from the list, event 336 that represents a message indicating that the subscriber has activated a control to display a message from the list, and event 338 representing a message indicating that the subscriber has activated a control to print a message from the list.

In response to event 334 the session control server 230 sends the contents of the selected audio message to the subscriber station 24 and sends control messages to instruct the subscriber station 24 to output the audio content through the voice interface 130 (FIG. 3). In response to event 336 the session control server 230 provides messages representing the message display content and the message display layout control that are compatible with parameters of the graphic display 90 on the subscriber device 50. In response to event 338, the session control server 230 formats the selected message into a printer compatible file and sends the print file to a printer coupled to the network 22.

SS Application

In the exemplary embodiment, the subscriber station (SS) application 115 is an event driven state machine. Within each processing state various events that are generated by one of the peripheral circuits may be detected by the SS application 115 and, upon detecting an event, a certain string of processing steps that correspond to the particular event will be performed by the SS application 115.

Referring to the tables of FIG. 7, in conjunction with the block diagram of FIG. 3, exemplary operational states of the SS application 115 are shown. The start up state 346 represents the state of operation of the subscriber station 24 immediately after establishing a network connection with the control unit 12 via the network 22. Upon establishing a connection, event 366, the SS application 115 initiates a session request to the session control server 230 on a predetermined port. Event 368 represents confirmation of the session from the session control server 230 and receipt of the logon script from the session control server 230. In response to event 368, the subscriber device processes the script which may include detecting the interface configuration of the subscriber station 24, providing the interface configuration to the session control server 230, and transitioning to the base state 344.

The base state 334 represents the SS application 115 waiting for an event signal from one of the peripheral devices which may include event 354 that represents subscriber activation of touch panel 72 on the modular subscriber interface unit 60*b*, event 356 that represents subscriber activation of one of the control buttons that may include a speed dial button 28*a*–28*e*, event 358 that represents receipt of display content and display layout control messages from the control unit 12, event 360 that represents receipt of a message comprising a processing script from the control unit 12, event 362 that represents a wide area network telephone signal through a wide area network subscriber device 88 (FIG. 1), event 364 that represents detecting a subscriber device 50 being coupled to the subscriber station 24, event 350 that represents receipt of a message from the control unit 12 directed to the subscriber device 50, and event 352 that represents receipt of a message from the subscriber device 50 directed to the control unit 12.

In response to event 356, the SS application 115 provides a message indicating the event to the session control server 230. In response to event 358, the SS application 115 provides a message indicating activation of the particular control buttons that may include a speed dial button 28*a*–28*e* to both the packet voice application 113 and the session control server 230. In response to event 358, the SS application 115 either updates the display 72 (or 72*a*) on the modular subscriber interface unit 60*b* (both of FIG. 2) via the touch panel controller 128 or provides the messages representing the display content and the display layout control to the subscriber device 50 via the communication controller 122 for the subscriber device 50 to update its own display. In response to event 360, the subscriber device 50 processes the script as provided including interfacing with any of the peripheral devices as required by the script. For example, the extraction control script received from the session control server 230 may require interrogating the subscriber device 50 for identity information and providing a message representing such identification information to the session control server 230. In response to event 362, the subscriber device 50 may enter a wide area network communication state wherein it relays a digital representation of voice signals between the dialog system 130 and a wide area network subscriber device 88 such that a voice conversation may take through the wide area network. In response to event 364, the subscriber station 24 may send a message indicating that a subscriber device 50 is being initialized by the subscriber station 24 (which corresponds to event 308 of FIG. 8*b*) and then returns to the base state 344. In response to event 350, the SS application 115 provides the messages to the subscriber device 50 via the communication controller 122. In response to event 352, the SS application 115 provides the messages to the session control server 230 via the network.

Packet Voice Application

The packet voice application 113 also operates as an event driven state machine. Again, each state includes a plurality of events that may occur when operating in the state and a sequence of steps that the packet voice application processes in response to the event. Referring to the tables of FIGS. 6*a* and 6*b* in conjunction with the block diagram of FIG. 3, exemplary operational states of the packet voice application 113 are shown.

The stand by state 380 represents the packet voice application in an inactive mode waiting for an event that may include event 388 which represents receipt of an audio session set up signal from the packet voice gateway 232, event 390 that represents receipt of a message from the SS application 115 that represents activation of the on/off hook button (or switch) 109, and event 392 that represents receipt of a message from the SS application 115 instructing the packet voice application 113 to set up an audio session with a specified destination.

In response to event 388, the packet voice application 113 transitions to a call signaling state 382 and reports the transition to the SS application 115. In response to event 390, the packet voice application 113 transitions to an off hook state 384 and reports the transition to the SS application 115. In response to event 392, the packet voice application 113 sends applicable call signaling messages to the packet voice gateway 232 to set up the audio session channel with the voice gateway 232 and provides for the voice gateway 232 to set up an appropriate audio session channel with the destination. The packet voice application 113 then transitions to the call signaling state 382, and report the transition to the SS application 115.

When in the call signaling state 382, the packet voice application 113 is providing a ring signal to the subscriber station 24 as either a ring signal to notify the subscriber of an incoming audio session or to notify the subscriber that an audio session set up signal has been sent to the packet voice gateway 232 and a destination device is "ringing" waiting for a remote party to effectively answer the call. During the ringing state 382 the packet voice application 113 may detect events such as event 394 that represents receipt of a message that represents activation of the on/off hook button 109 (FIG. 2), event 396 that represents termination of call signaling by the packet voice gateway 232, event 398 that represents receipt of a ready for audio session signal from the packet voice gateway 232 if the packet voice application 113 is ringing to notify the subscriber that a remote device is ringing.

In response to either event 394 (and event 396 if the subscriber station 24 is currently off hook), the packet voice application 113 will return to the standby state 380 and report the state transition to the SS application 115. In response to event 398 (and event 396 if the subscriber station 24 is current on hook) the packet voice application will transition to an audio session state 386 and report he transition to the SS application 115.

When in the off hook state 384, the packet voice application 113 may be generating a dial tone through the voice system 130 as a prompt for the subscriber to use the keypad to enter a telephone number. During the off hook state 384, the packet voice application 113 may accept events such as event 400 that represents receipt of a message that represents key pad activation, event 402 that represents validation of a number sequence as a complete telephone number that can be used to set up an audio session, and event 404 that represents receipt of a message that represents activation of the on/off hook button 109 (FIG. 2).

In response event 400 the packet voice application 113 generates a DTMF tone through the voice system 130 to provide the subscriber with audio feedback and store the numeral as part of the sequence for validation. In response to event 402, the packet voice application 113 initiates call signaling to the packet voice gateway 232 utilizing the validated number as the destination, transitions to the call signaling state 382, and reports the transition to the SS application 115. In response to event 404, the packet voice application 113 transitions to the standby state 380 and reports the transition to the SS application 115.

When in the audio session state 386 the packet voice application 113 is relaying messages representing a real time audio dialog between the voice system 130 and the packet voice gateway 232. When in the audio session state 386, the packet voice application 113 may accept events such as event 406 that represents termination of the audio session by the packet voice gateway 232, event 408 that represents receipt of a message that represents subscriber activation of a keypad numeral, and event 410 that represents receipt of a message that represents activation of the on/off hook button 109 (FIG. 2).

In response to event 406, the packet voice application 113 returns to the off hook state and reports the transition to the SS application. In response to event 408, the packet voice application 113 generates a DTMF tone in the audio session signals to the packet voice gateway 232. In response to event 410, the packet voice application 113 returns to the stand by state 380 and reports the state transition to the SS application 115.

It should be appreciated that the systems and methods of the present invention provide for a convenient speed dial system for both programming and operation. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A communication system for operation with a plurality of subscriber devices, each associated with a subscriber, the communication system comprising:

a control unit comprising a speed dial directory and a session control server, the speed dial directory storing, for each subscriber, a list of speed dial destinations, a telephone code associate with each speed dial destination, and a graphic image file associated with each speed dial destination;

the session control server, in response to an indication that a subscriber device has been coupled to a subscriber station, obtains identification of the subscriber device and provides to the subscriber device the graphic image files associated with of the subscriber's speed dial destinations; and a subscriber station coupled to the control unit and comprising:

a docking bay for coupling a subscriber device to the subscriber station;

display means for generating a plurality of images in accordance with the image files provided by the control unit; and input means on the communication device for enabling a user to select a one of the plurality of images to signal the control unit to initiate a connection to the destination associated with the selected image.

2. The communication system of claim 1, wherein said input means comprises:

a touch panel having a touch sensitive surface overlaying the display means for enabling said subscriber to select one of the images generated by the display means via contact with said touch sensitive surface.

3. The communication system of claim 1, wherein said input means comprises:

a plurality of buttons, each associated with a the display means, for enabling said subscriber to select one of the images generated by the display screen by operation of the one of the plurality of buttons associated with the image.

4. The communication system of claim 1, further comprising:

wireless link means for establishing a wireless communication link between the control unit and the communication device and wherein the plurality of images associated with the subscriber are provided to the display means via the wireless link.

5. The communication system of claim 1, wherein said speed dialing means comprises:

image programming means for enabling the subscriber to load an image to the speed dial directory means and associate the image to a code associated with the subscriber.

6. A method of providing speed dial functionality in a communication system which operates with a plurality of subscriber devices, each associated with a subscriber, and which comprises a subscriber station coupled to a control unit that operates to interconnect the subscriber station to a destination communication endpoint, the method comprising:

storing a plurality of images, each in associated with a code defining a destination communication end point in a speed dial directory of the control unit;

obtaining identification of a subscriber device coupled to a subscriber station;

providing to the subscriber station the plurality of images that are associated with destinations codes that are associated with the subscriber device;

displaying on the subscriber station each of the plurality of images in association with subscriber input means;

detecting subscriber selection of an image via subscriber input means;

establishing a communication session with the destination communication end point defined by the code associated with the selected image.

7. The method of claim 6, wherein:

displaying each of the plurality of images comprises displaying the plurality of images on a touch panel having a touch sensitive surface overlaying a display screen; and detecting subscriber selection of an image comprises detecting subscriber contact with a portion of the touch sensitive service overlaying the selected image.

8. The method of claim 6, wherein:

displaying each of the plurality of images comprises displaying each image on a display panel associated with a subscriber activated button; and detecting subscriber selection of an image comprises detecting subscriber activation of the button associated with the selected image.

* * * * *